United States Patent [19]

Lauber

[11] Patent Number: 5,379,667
[45] Date of Patent: Jan. 10, 1995

[54] PINCH CUTTING METHOD AND APPARATUS

[75] Inventor: Michael L. Lauber, Uniontown, Ohio
[73] Assignee: General Tire, Akron, Ohio
[21] Appl. No.: 783,516
[22] Filed: Oct. 28, 1991
[51] Int. Cl.$^6$ .............................................. B26D 5/16
[52] U.S. Cl. ........................................ 83/16; 83/171; 83/564; 83/571; 83/602
[58] Field of Search ................. 83/171, 602, 628, 564, 83/571, 16

[56] References Cited

U.S. PATENT DOCUMENTS

| | | | |
|---|---|---|---|
| 181,658 | 8/1876 | Fladger | 83/602 X |
| 216,107 | 6/1879 | Richards | 83/628 X |
| 697,232 | 4/1902 | Camp | 83/602 |
| 2,186,884 | 1/1940 | Shomaker | 83/602 |
| 3,248,983 | 5/1966 | Denny et al. | 83/602 X |
| 3,762,253 | 10/1973 | Loomis, Jr. et al. | 83/602 X |
| 3,800,647 | 4/1974 | Morse et al. | 83/628 X |
| 4,426,901 | 1/1984 | Hogan et al. | 83/861 |
| 4,444,079 | 4/1984 | Newkirk | 83/602 X |
| 4,498,948 | 2/1985 | Brown et al. | 156/401 |
| 4,544,397 | 10/1985 | Fenton | 83/602 |
| 4,693,701 | 9/1987 | deBin | 83/171 X |

*Primary Examiner*—Rinaldi I. Rada
*Attorney, Agent, or Firm*—Calfee Halter & Griswold

[57] ABSTRACT

An apparatus for cutting lengths of material is provided having a pair of scroll type cams adapted to operate a pair of laterally opposed cutting blades. The apparatus comprises a frame having a front end, a rear end, and generally parallel side members laterally opposed to each other and spaced apart by a plurality of rollers extending generally perpendicular between the parallel side members of the frame. The pair of laterally opposed cutting blades are pivotally connected to the front end of the frame. The blades are constructed from a metallic material, the surfaces of which may be heated electrically to facilitate cutting. The scroll type cams are rotatably mounted to each side of the frame near the ends of the cutting blades and are adapted to engage cam followers connected to the blades. Pneumatically operated cylinders simultaneously rotate each of the scroll cams in the same direction with respect to the frame to convert rotational motion of the cams to linear motion of the cam followers. Rotational movement of the scroll cams together in counterclockwise and clockwise directions is thereby translated into linear movement of the cutting blades toward and away from each other, respectively.

15 Claims, 8 Drawing Sheets

PINCH CUTTING METHOD AND APPARATUS

FIELD OF THE INVENTION

The present invention relates generally to machinery for cutting sheets of material, and more particularly to a scroll operated apparatus and method for cutting lengths of tire building material to form pieces having ends which can be easily spliced together.

BACKGROUND OF THE INVENTION

Certain manufacturing processes require the attachment of overlapping ends of a precise length of material together to form a continuous loop of the material. Often, the precise length is cut from a continuous supply of the material. Heat treatment, or curing, is typically utilized to fuse the attached overlapping ends of the length of material together to increase the strength of the joint.

An example of such a manufacturing process is tire building, wherein a precise length of rubber or other material is wrapped around a mandrel or drum to form part of the tire. The length of rubber or other material is cut so that the ends of the length overlap to form a splice. The overlapping ends are temporarily attached together to form a loop of material which is then cured to strengthen the rubber.

The presence of a splice in the continuous loop of rubber or other material presents several problems. First, the double thickness of the spliced joint in the continuous loop of rubber or other material upsets the rotational balance of the tire formed therefrom. In addition, air is likely to be captured between the two overlapping ends of material, thereby weakening the resulting splice. Moreover, the entire material loop must be cured for the length of time required to cure the spliced joint of double thickness.

By reducing the length and the thickness of the splice, the rotational balance of the tire is improved. The area between the overlapping ends of rubber or other material is reduced, thereby minimizing the amount of air which can be captured therebetween to weaken the resulting joint. In addition, curing time for the continuous loop is reduced, permitting greater throughput by the associated curing equipment.

Devices for cutting sheets of material to be spliced together are known. For example, U.S. Pat. No. 4,426,901 to Hogan et al. discloses a cutter having heated, eccentrically mounted rollers which coact with each other to partially sever predetermined lengths of material from a continuous roll of the material. Retraction of a transport member, which works in conjunction with the eccentrically mounted rollers, completes the severing of the material. Material sheets having tapered ends are thereby provided using a two step process.

Thus, advantages exist for reducing the length and the thickness of spliced joints formed in materials used to manufacture tires. The present invention provides a simplified apparatus and method for affording these advantages, while providing a high degree of flexibility in design and operation.

SUMMARY OF THE INVENTION

According to the present invention, an apparatus and method are provided for cutting accurate lengths of rubber or other material from a continuous supply of the material. The apparatus is relatively compact in size, and may be attached to existing servicers which dispense the material from the continuous supply to an operator or to the next processing step.

The pinch cutting apparatus of the present invention includes a pair of scroll type cams adapted to operate a pair of cutting blades. The pair of cutting blades are pivotally mounted to a substantially rigid frame which is attachable to an existing servicer. A series of rollers span the frame for transporting the material to be cut from the servicer to the blades. Means for urging the pair of cutting blades into contact with and away from each other are also provided, comprising a pair of pneumatically operated scrolls rotatably mounted to the frame, and cam followers mounted to each of the pair of pivoting blades which are adapted to engage the scrolls.

Extending from each side of a back end of the frame are cylindrical mounting posts, at which posts the pinch cutting apparatus may be pivotally attached to a servicer. Extending from each side of a front end of the frame are a pair of adjustable mounting arms. The adjustable mounting arms provide support for the end of the frame from which they extend, as well as means to adjust the position of the pinch cutting apparatus with respect to the servicer to which it is attached.

The series of rollers which span the rigid frame are arranged in a generally planar pattern and are adapted to transport material from the servicer to the blades on the pinch cutting apparatus. A pair of guide rails extending upwardly from the frame are used to center the material on the series of rollers. A manual cable assembly provides means for adjusting the distance between the guide rails to accommodate various widths of material to be cut.

The pair of cutting blades are electrically heated to assist in cutting through the rubber or other material passing over the series of rollers. Each of the blades is attached to a pinch beam which is in turn mounted to a pivot arm. Each of the pivot arms is mounted to the frame of the pinch cutting apparatus at a common pivot point. The common pivot point ensures that the two cutting blades are aligned with each other during the cutting process. By pivoting the pivot arms about this point toward the back end of the frame, the pinch beams and the attached cutting blades move from a position generally perpendicular to the plane of the series of rollers to a position generally parallel to the rollers. The pivot arms are pivoted about the common pivot point by means of a pneumatic cylinder. A linkage arrangement is attached at one end to the piston in the cylinder and at the other end to each of the pivot arms.

When the piston attached to the linkage arrangement is extended, the pinch beams are positioned generally perpendicular to the series of rollers. In this position, the attached cutting blades face each other but remain separated by a distance sufficient to permit a length of rubber or other material to pass therethrough. The cutting blades are brought into contact with each other to cut through the material by rotating the scrolls. Rotation of the scrolls is controlled by a pair of pneumatic cylinders located on opposite sides of the frame.

The scrolls are adapted to convert the relatively small rotational force provided by the pair of pneumatic cylinders to the relatively large linear force required by the cutting blades to sever the rubber or other material. The scrolls transmit this linear force to the blades by means of cam followers, which are fixedly attached to the pinch beams and are adapted to engage the scrolls. Upon rotation of the scrolls, the cam followers are forced toward each other. The electrically heated cutting blades are thereby forced through the material to be cut and into contact with each other. By reversing the rotation of the scrolls, the cam followers, and hence the cutting blades, are forced away from each other. The pinch beam support members may then be pivoted toward the back end of the frame so that the pinch beams are positioned parallel to the series of rollers. The pinch beams in this position provide greater clearance near the cutting area for maneuvering the next length of rubber or other material into position for cutting.

DETAILED DESCRIPTION OF THE PREFERRED EMBODIMENT

Figure 1A:
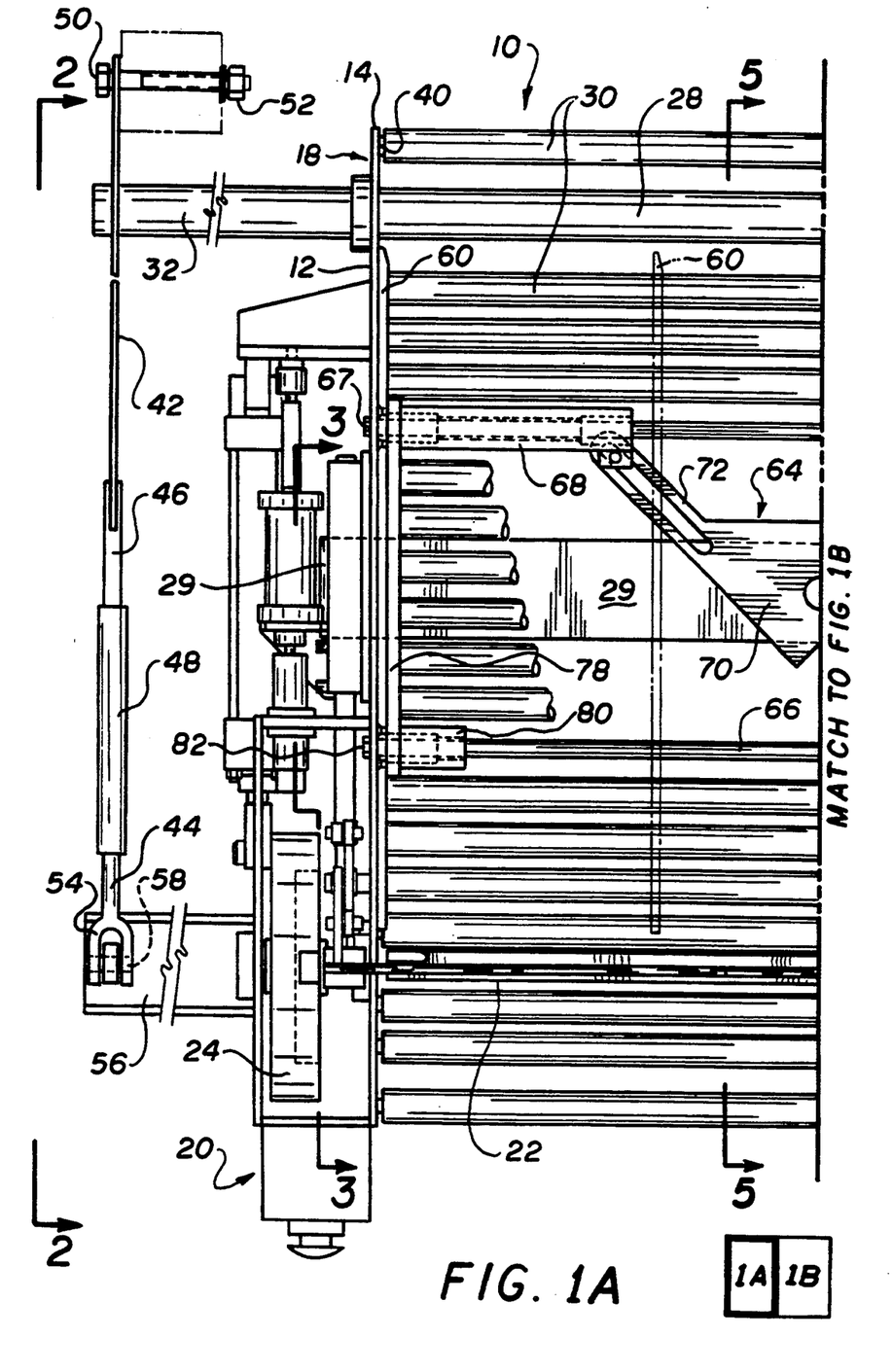
FIGS. 1A and 1B, taken together, are a plan view of the pinch cutting apparatus constructed according to the principles of the present invention.
Figure 1B:
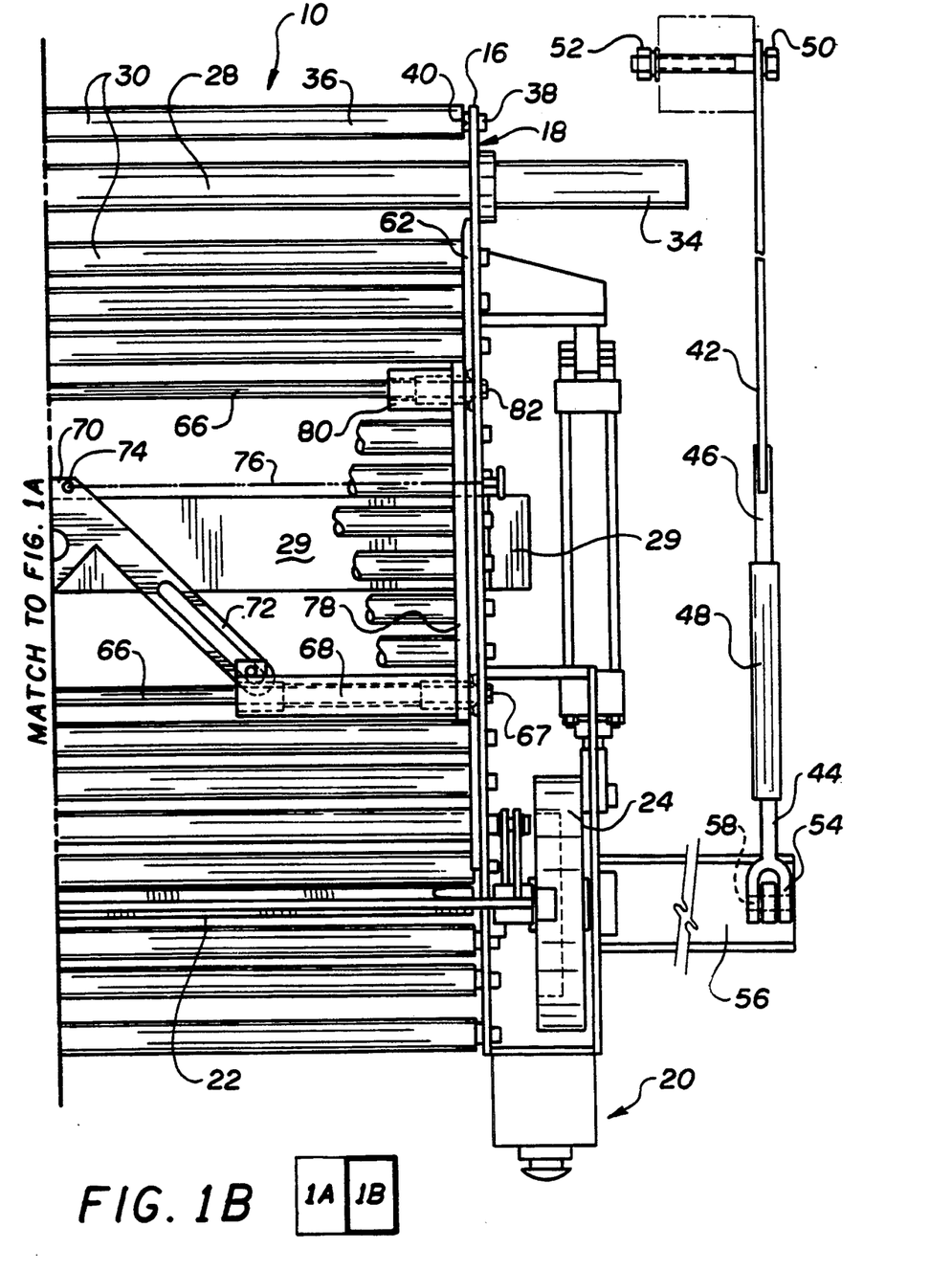

A pinch cutting apparatus constructed according to the principles of the present invention is shown in FIGS. 1A and 1B generally at 10. The pinch cutting apparatus 10 is built around a substantially rigid frame 12 which comprises a pair of laterally opposed side members 14 and 16, each of which is preferably a steel beam. The ends of the laterally opposed side members 14 and 16 define a rear end 18 of the frame at which the apparatus may be attached to an existing servicer for dispensing material to be cut, and a front end 20 of the frame opposite the rear end 18. Pivotally connected with the front end 20 of the frame are a pair of cutting blades 22. The cutting blades are urged into contact with and drawn away from each other by the rotation of a pair of scrolls 24 which are rotatably mounted to the front end of the frame and which engage cam followers 26 operably connected to the cutting blades 22 (see FIGS. 2A, 2B). The side members 14 and 16 are supported and maintained in a spaced apart relationship by a rear mounting shaft 28, a central support beam 29 and a series of rollers 30. The mounting shaft 28 is preferably a solid steel shaft which connects the side members to each other near the rear end 18 of the frame. The ends of the mounting shaft 28 extend beyond the side rails to provide extensions 32 and 34 at which the pinch cutting apparatus may be attached to the material dispensing servicer. The central support beam spans the side members and is also preferably made from steel.

The side members 14 and 16 are additionally supported and maintained in a spaced apart relationship by the series of rollers 30 which span the distance separating the side members. The series of rollers 30 facilitate transfer of the material to be cut from the existing servicer attached to the rear end 18 of the frame to the cutting blades located at the front end 20 of the frame. Each of the rollers comprises a cylindrical sleeve 36 surrounding a roller shaft 38. Suitable bearing means 40 may be utilized intermediate the roller sleeve and shaft. The rollers may be connected to the side rails by conventional means such as a threaded shaft and a nut screwed thereon.

The pinch cutting apparatus is mounted to the existing servicer at the front end 20 of the frame by means of a pair of adjustable hangers 42 located on either side of the frame. Each adjustable hanger comprises a front member 44 and a rear member 46 having threaded ends which are connected by a threaded sleeve 48. Rotation of the threaded sleeve adjusts the distance between the front and rear members of the hanger. The end of the rear member 46 opposite the threaded end may be connected to the servicer by means of a bolt 50 and a nut 52. The front member 44 is provided with a double eyelet 54 opposite the threaded end. The double eyelet is attached to a front frame extension 56 extending perpendicularly from the frame side members by means of a pin 58. The adjustable hangers 42 thereby provide means for attaching the pinch cutting apparatus to a variety of servicer mounting arrangements.

The pinch cutting apparatus is also provided with means to accommodate a variety of widths of material to be cut. Left and right guide rails 60 and 62, respectively, are adapted to guide the material down the center of the series of rollers 30. The distance between the guide rails is adjustable by means of a manually operated guide adjust mechanism 64 which moves each of the guide rails equal distances when operated. Although a manual cable-operated mechanism is shown in FIGS. 1A and 1B, it is contemplated that any suitable guide adjust mechanism, either manual or automatic, may be used with the apparatus 10.

The guide adjust mechanism comprises a pair of parallel shafts 66 extending between the side rails and mounted thereto by bolts 67, a pair of primary sleeves 68 which are connected with the guide rails and slide along the shafts 66, and a plate 70 which is pivotally mounted to the central support beam 29. The plate 70 is provided with slotted arms 72 which are adapted to engage portions of the primary sleeves 68, and a cable mount 74 to which cable 76 is attached. Movement of the cable 76 pivots the plate 70 which in turn forces the primary sleeves 68 inwardly toward each other or outwardly away from each other. The primary sleeves 68 are connected with the guide rails 60, 62 by means of a pair of metal bars 78 and a pair of secondary sleeves 80 which insure parallel movement of the side rails with respect to each other. Thus, movement of the cable 76 is translated into equivalent movement of the guide rails toward and away from each other. The primary and secondary sleeves 68 and 80, and the pair of metal bars 78, are attached to the side rails by common fasteners such as screws 82.

The mechanism for cutting the sheets of material transported along the series of rollers comprises the pair of pivotally mounted cutting blades 22 and the pair of pneumatically operated scrolls 24. The cutting blades are adapted to move from a position parallel to the plane containing the series of rollers when not in use to a position perpendicular to the plane when in operation. The pneumatically operated scrolls engage the cutting blades when in this perpendicular position to force the blades into contact with each other to sever the material.

Figure 2A:
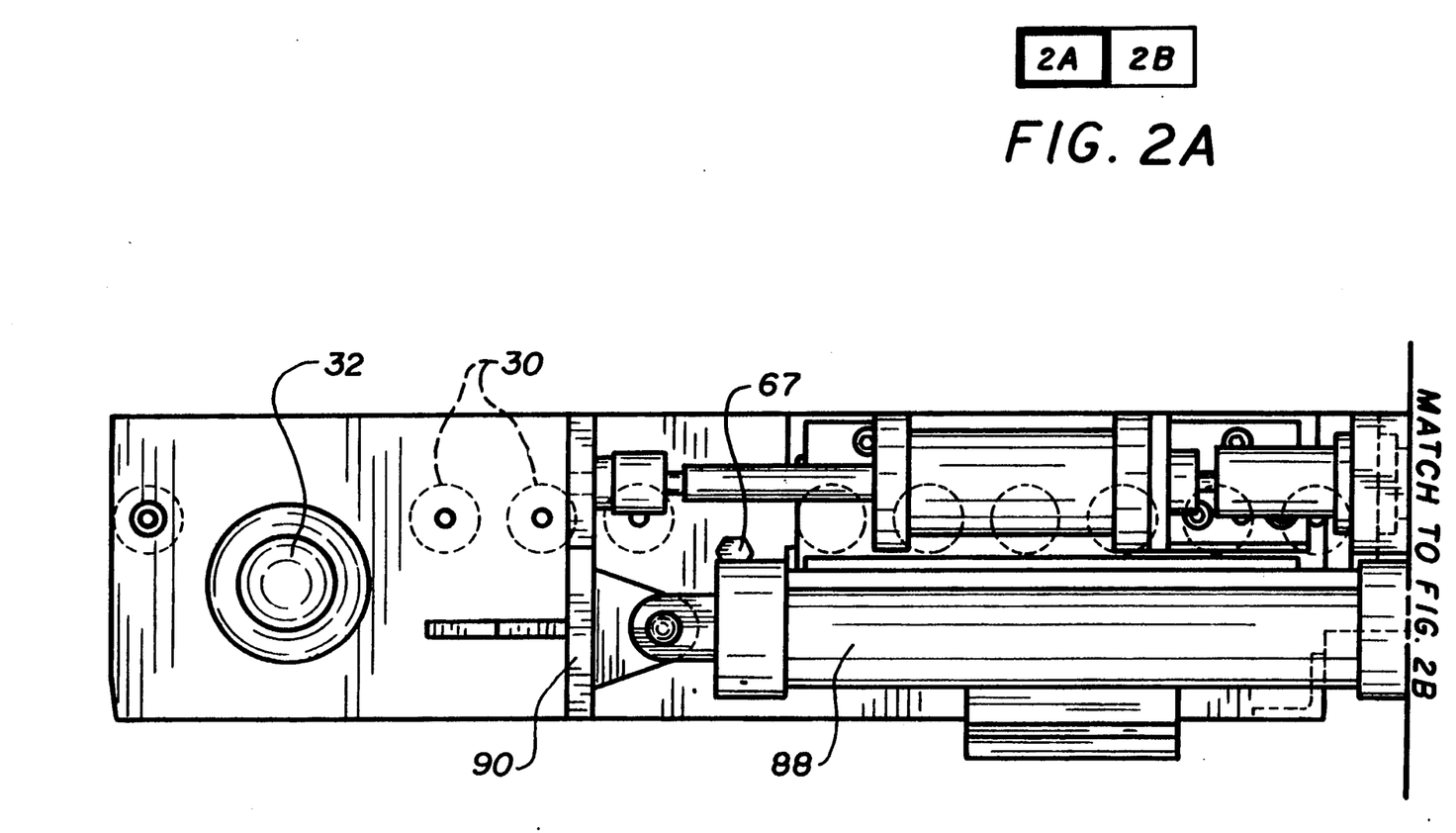
FIGS. 2A and 2B, taken together, are a side view of the pinch cutting apparatus of FIGS. 1A and 1B.
Figure 2B:
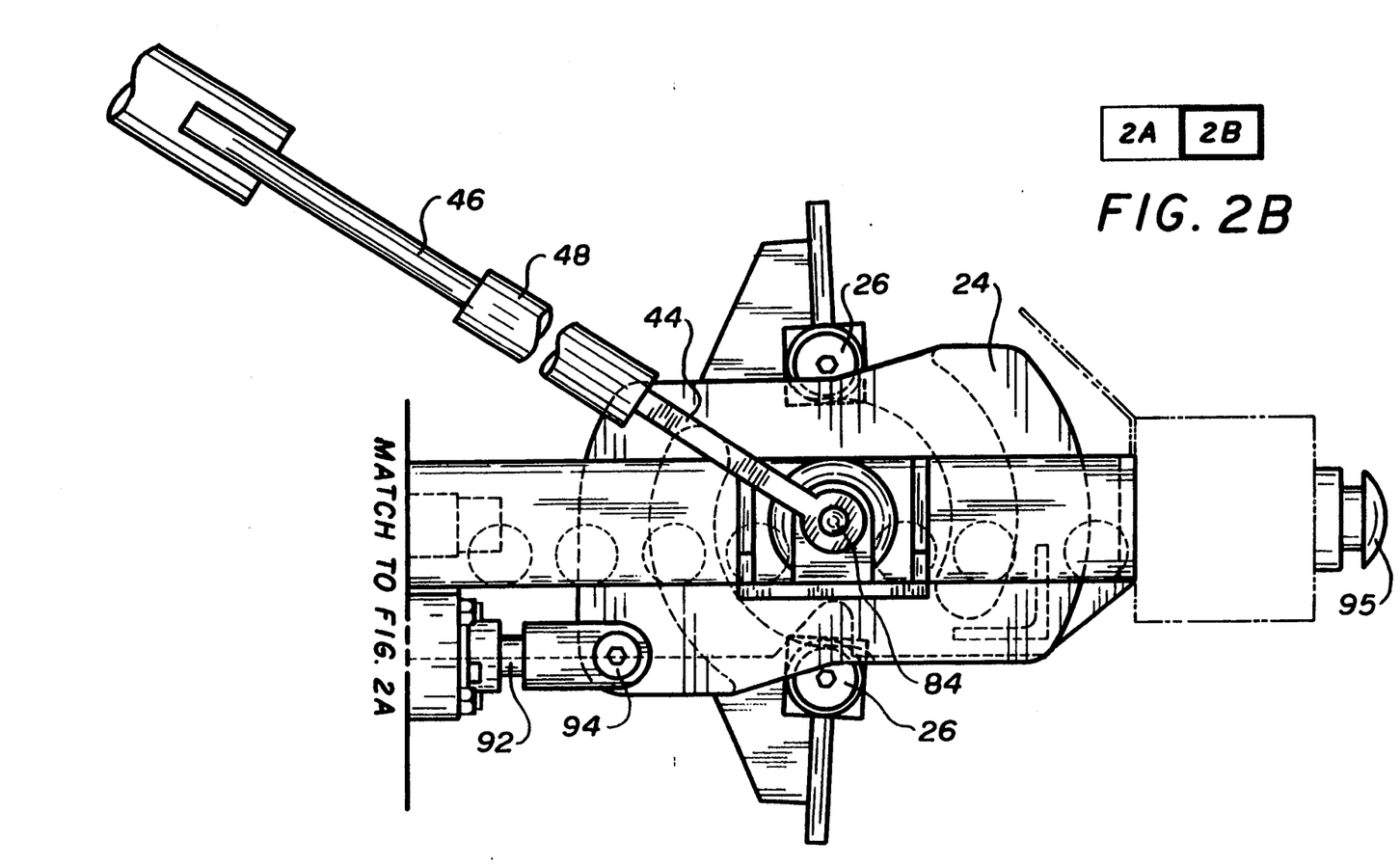

The relationship between the scrolls 24 and the blades 22 is better illustrated in FIGS. 2A and 2B. Each of the pair of scrolls 24 is rotatably mounted near its center on a side of the frame at a center post 84. The scrolls are preferably constructed from hardened steel plates having a groove pattern therein which spirals outwardly from the center. Cam followers 26 connected with the cutting blades 22 are adapted to engage the groove pattern in the scrolls to permit the blades to move relative to each other when the scrolls are rotated.

The means to rotate the scrolls 24 are provided by a pair of pneumatic cylinders 88, one of which is associated with each scroll. Although pneumatic cylinders are shown, the invention contemplates other means for imparting rotational movement to the scrolls, including but not limited to, hydraulic cylinders or gear assemblies. One end of each cylinder is pivotally attached to a rear frame extension 90 extending outwardly from the frame 12. A piston 92 extendable from the other end of each cylinder is pivotally attached to each scroll at a mounting point 94. As shown in FIGS. 2A and 2B, the scroll is rotated fully clockwise, piston 92 is in a retracted position, and the cutting blades (not shown) are spaced apart about one eighth of an inch. Such a distance is sufficient for cutting a variety of materials including rubber tire interliner, which typically has a thickness range of about 0.050 inch to about 0.070 inch.

When the cylinders 88 are connected to a source of pressurized supply air, the piston is extendable to rotate the scrolls in a counterclockwise motion as viewed from the sides of the apparatus. In the preferred embodiment, the scrolls are rotated counterclockwise approximately 110 degrees from the position shown in FIG. 2B, thereby engaging the cam followers 26. Due to the spiral shape of the grooves in each of the scrolls, the cam followers 26, and hence the cutting blades 22, are forced toward each other. Thus, the scrolls convert the relatively small rotational force applied thereto by the pneumatic cylinders 88 to a relatively large linear force which is transmitted to the cutting blades by means of the cam followers. In the preferred embodiment, the cutting blades moving through a distance of about one eighth of an inch develop a linear cutting force sufficient to cut through sheets of material passing between the blades. Because of this large cutting force, the apparatus is provided with a pair of palm safety switches 95. The safety switches 95 may be incorporated into the system so that the pneumatic cylinders are inoperative unless both palm switches are depressed, thereby insuring that an operator's hands are not near the blades during the cutting process.

The pair of cutting blades are forced away from each other after a particular cut has been made by retracting the pistons 92 of the pneumatic cylinders 88. Retraction of the pistons in turn rotates the scrolls 24 clockwise, which again forces the cutting blades apart. The cutting blades may then be pivoted out of the way in order to provide more clearance for the next sheet of material to be cut.

Figure 3A:
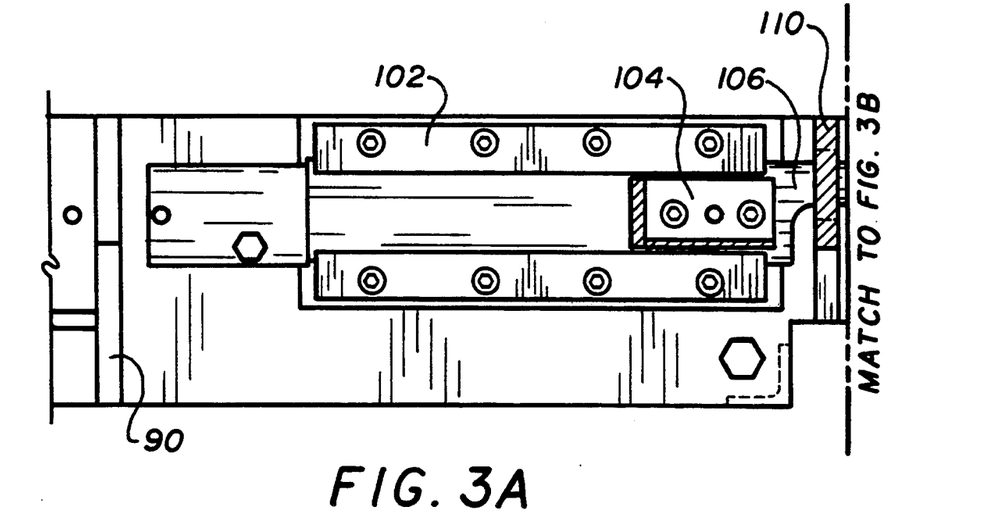
FIGS. 3A and 3B, taken together, are a sectional view of the pinch cutting apparatus of FIGS. 1A and 1B, taken along the line 3—3, and showing the blades of the apparatus in closed position.
Figure 3B:
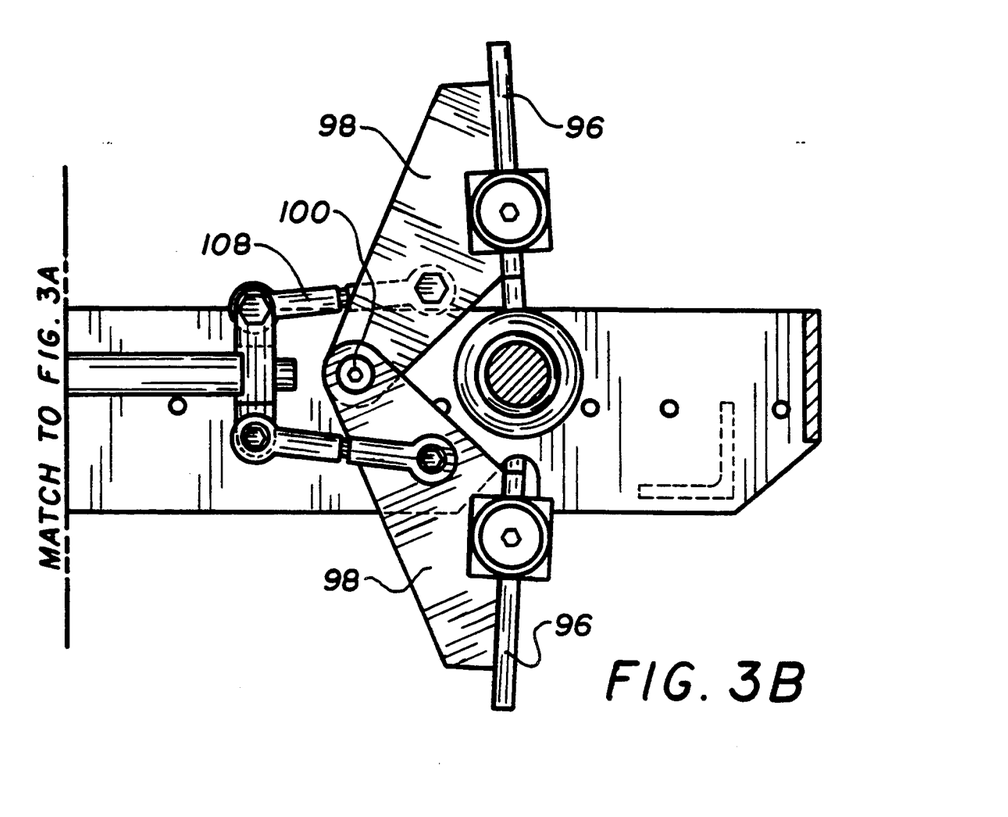
Figure 4:
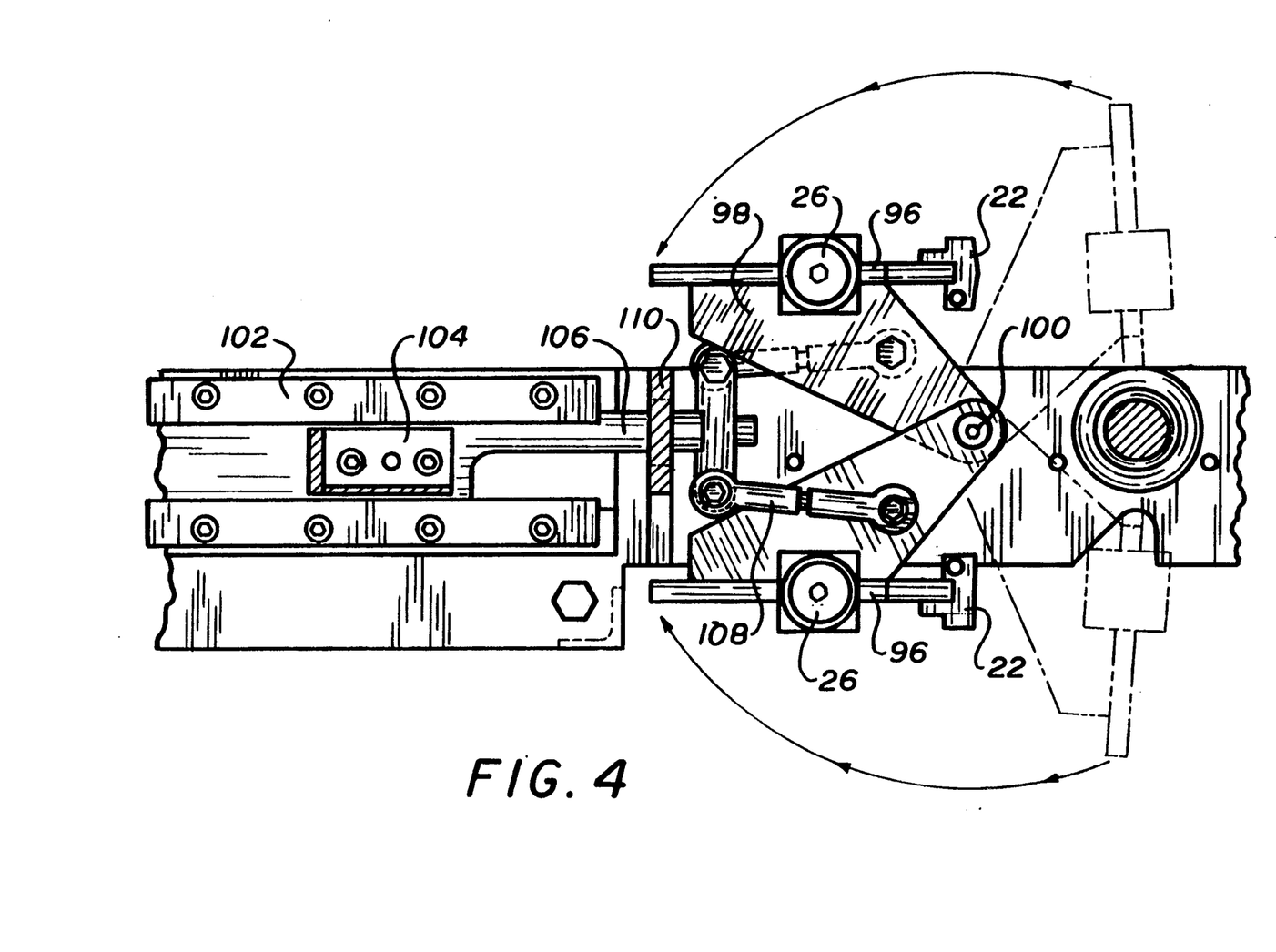
FIG. 4 is a partial sectional view of the pinch cutting apparatus of FIGS. 1A and 1B, taken along the line 3—3, and showing the blades of the apparatus in open position.

FIGS. 3A, 3B and 4 better illustrate the pivoting action of the cutting blades 22. Each of the cutting blades 22 is mounted at the end of a pinch beam 96. The pinch beams 96 are attached to a pair of pivot arms 98 which are pivotally mounted to a common pivot point 100 on the frame 12. A third pneumatic cylinder 102, having less output power capability than the pair of pneumatic cylinders 88 which operate the scrolls 24, is used to pivot the arms 98, and hence the blades 22, about point 100 on the frame. Although a pneumatic cylinder is shown, the invention contemplates other means for imparting pivotal movement to the blades, including but not limited to, hydraulic cylinders or gear assemblies. The pinch beams 96 can thus be pivoted from a position generally perpendicular to the series of rollers (as shown in FIGS. 3A, 3B) to a position generally parallel to the plane of the rollers (as shown in FIG. 4).

The pneumatic cylinder 102 is attached to the rear frame extension 90 near the rear end of the frame, and is provided with a piston 104 having an extension 106 attached thereto. The piston extension 106 is connected with the pair of pivot arms 98 by means of a linkage arrangement 108. When the piston 104 is fully extended from the cylinder, the pinch beams 96 are perpendicular to the rollers and the cam followers 26 are in a position to engage the scrolls 24 (see FIGS. 2A, 2B).

The piston 104 is adapted to be retracted until the linkage 108 abuts a frame mounted stop 110. In this position, the cam followers cannot engage the scrolls, and thus rotation of the scrolls will not affect the position of the blades. In order to proceed with the next cutting sequence, the piston 104 must again be extended so that the cam followers are in position to engage the scrolls. The pair of cylinders 88 can then be activated to extend the pistons 92 and thereby rotate the scrolls 24 counterclockwise to force the blades into contact with each other. In the preferred embodiment of the present invention, the output of a programmable controller (not shown) may be utilized to control the sequential operation of cylinders 88 and 102. In such an embodiment, the palm operated safety switches 95 may be used as inputs to the controller to disable the operation of the cylinders if the switches are not depressed.

Figure 5A:
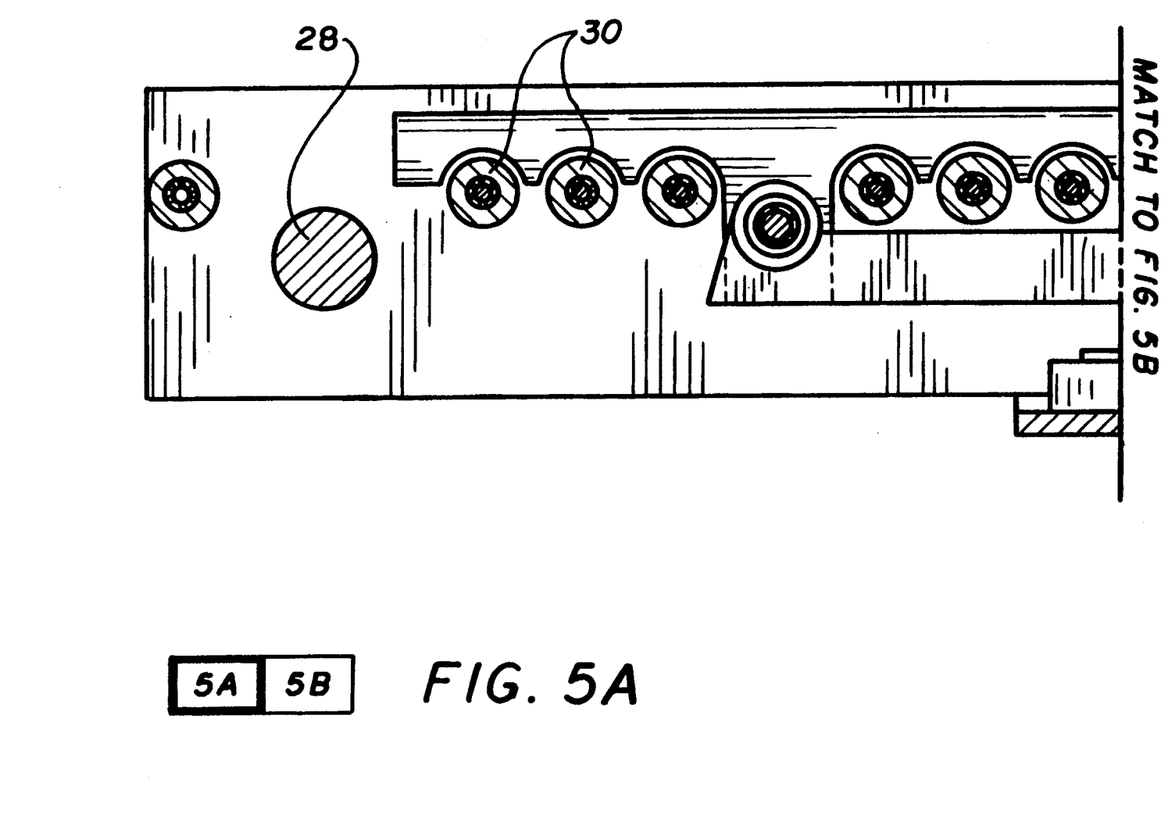
FIGS. 5A and 5B, taken together, are a sectional view of the pinch cutting apparatus of FIGS. 1A and 1B, taken along the line 5—5.
Figure 5B:
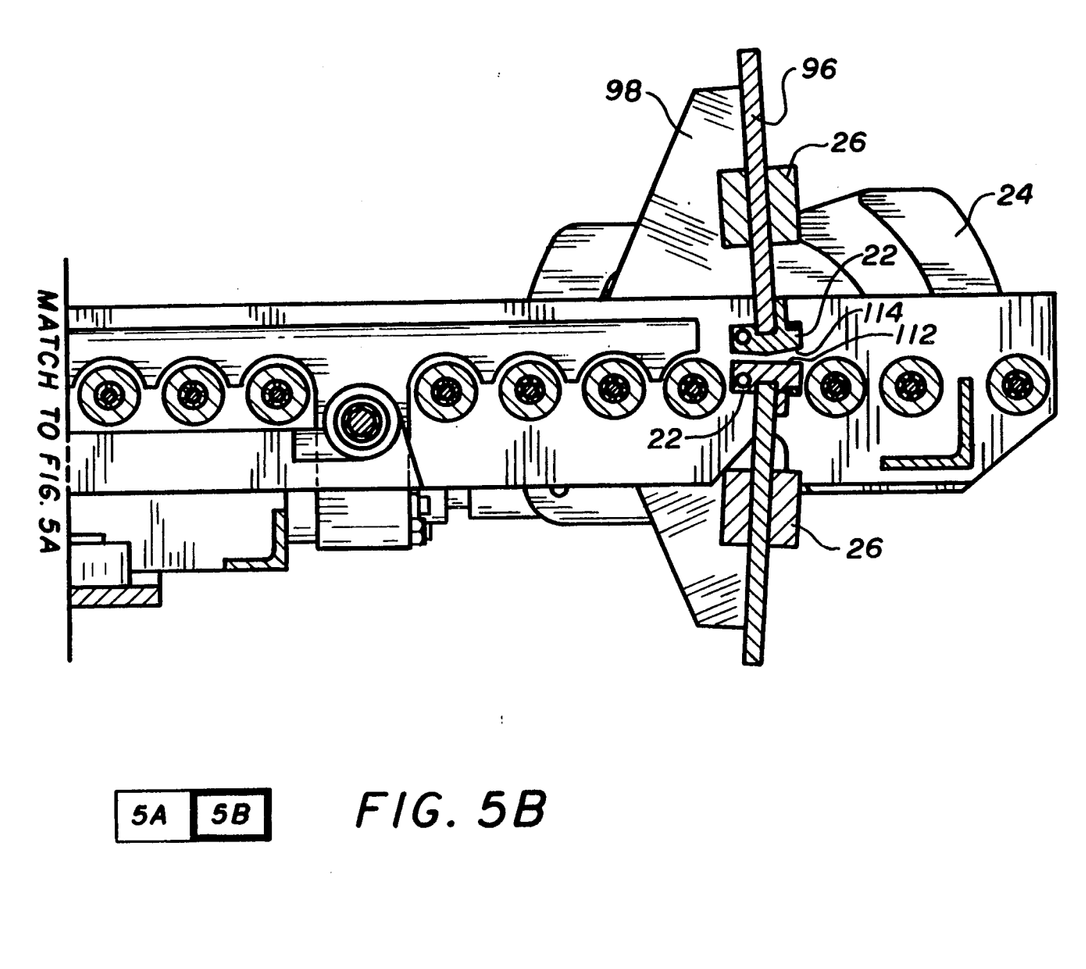

The pair of cutting blades 22 are shown in better detail in FIGS. 5A and 5B. The blades are preferably made of a metallic material and are electrically heated by cartridge heaters (not shown) which assist the blades in the cutting process. As shown in FIG. 5B, the lower blade has a flat cutting surface 112 while the upper blade has a gradually tapered cutting surface 114. In the preferred embodiment, the gradual taper is around ten degrees, as measured from the flat lower cutting surface when the blades are in alignment and contacting each other. The tapered upper blade results in finished lengths of material having tapered cut edges. Such tapered edges permit splicing of both ends of the material in a manner which significantly reduces overlap.

Accordingly, a pinch cutting method and apparatus have been described in the preferred form. However, with the present disclosure in mind, it is understood that the present disclosure of the preferred embodiment is made only by way of example, and that various changes may be implemented without departing from the true spirit and scope of the invention as hereinafter claimed.

I claim:

1. A method of cutting lengths of material comprising the steps of:

passing a length of material between a pair of vertically opposed cutting blades having ends which are operably connected to cam followers;

rotating a pair of rotatably driven cam plates having arcuate scroll grooves cut therein to selectively engage said cam followers to translate rotational movement of said cam plates to generally vertical movement of said cutting blades to cut said material;

disengaging said cam followers from said grooves in said cam plates; and pivoting said pair of cutting blades from a position which is generally perpendicular to a plane containing said length of material to a position generally parallel to said plane containing said length of material intermediate subsequent cutting sequences.

2. The method of claim 1, further comprising the step of electrically heating a surface of one or both of said vertically opposed cutting blades.

3. An apparatus for cutting lengths of material, comprising:
a frame;
a rotatably driven cam rotatably mounted to said frame and comprising at least one generally planar plate having a pair of arcuate scroll grooves therein, each of said arcuate scroll grooves having a closed end and an open end, said open end formed at an edge of said planar plate;
a cam follower mechanism engageable with said rotatably driven cam via said open ends of said arcuate scroll grooves to cause movement of said cam follower mechanism in response to rotation of said cam; and
a pair of vertically opposed cutting blades operably connected with said cam follower mechanism.

4. An apparatus for cutting lengths of material, comprising:
a frame;
a rotatably driven cam rotatably mounted to said frame and comprising at least one generally planar plate having a pair of arcuate scroll grooves therein, each of said arcuate scroll grooves having a closed end and an open end, said open end formed at an edge of said planar plate;
a pair of cam followers engageable with said rotatably driven cam via said open ends of said arcuate scroll grooves to cause movement of said cam followers in response to rotation of said cam; and
a pair of vertically opposed cutting blades operably connected with said cam followers, each of said pair of cam followers operably connected with one of said cutting blades and engageable with said rotatably driven cam via one of said pair of arcuate scroll grooves.

5. The apparatus of claim 4, wherein said frame has a front end, a rear end, and generally parallel side members laterally opposed to each other and spaced apart by a plurality of rollers extending generally perpendicular between said parallel side members.

6. The apparatus of claim 5, further comprising a pair of laterally opposed and spaced apart guide members generally parallel to each other and to each of said generally parallel side members of said frame.

7. The apparatus of claim 6, further comprising a guide adjust mechanism for adjusting the spaced apart distance between said laterally opposed guide members.

8. The apparatus of claim 5, further comprising means to mount said frame to a machine for dispensing material to be cut.

9. The apparatus of claim 8, wherein said pair of vertically opposed cutting blades are mounted near said front end of said frame, and said mounting means comprises a pair of mounting extensions located near said rear end of said frame, said mounting extensions extending generally parallel to said rollers of said frame.

10. The apparatus of claim 8, wherein said mounting means further comprises a pair of manually adjustable hanger members extending from the frame near said front end thereof.

11. The apparatus of claim 4, further comprising at least one pneumatically operated cylinder operatively connected at one end to said frame and at the other end to said planar plate.

12. An apparatus for cutting lengths of material, comprising:
a frame;
a pair of generally planar rotatably driven cam plates having arcuate scroll grooves cut therein, each of said cam plates being rotatably mounted to said frame;
two pairs of cam followers, each pair of cam followers being associated with one of said pair of cam plates and being selectively engageable with said arcuate scroll grooves to cause said cam followers to move toward each other in response to rotation of said cam plates when engaged with said cam and to permit independent movement of said cam plates and said cam followers when not so engaged;
at least one pneumatically operated cylinder operatively connected at one end to said frame and at the other to one of said cam plates;
a pair of vertically opposed cutting blades each having first and second ends, said first ends being operably connected with one of said pairs of cam followers, said second ends being operably connected with the other of said pairs of cam followers, said pair of cutting blades being constructed from a metallic material and having electrically heated cutting surfaces; and
means to disengage said cam followers from said grooves in said cam plates and pivot said pair of cutting blades toward said rear end of said frame about a common point located on said frame, wherein said means to disengage said cam followers and pivot said cutting blades comprises a pneumatically operated cylinder operatively connected at one end to said frame and at the other end to said cutting blades.

13. The apparatus of claim 12, wherein said frame has a front end, a rear end, and generally parallel side members laterally opposed to each other and spaced apart by a plurality of rollers extending generally perpendicular between said parallel side members.

14. The apparatus of claim 13, further comprising a pair of laterally opposed and spaced apart guide members generally parallel to each other and to each of said generally parallel side members of said frame, said guide members being adjustable to vary the spaced apart distance therebetween.

15. The apparatus of claim 13, further comprising means to mount said frame to a machine for dispensing the material to be cut, said mounting means comprising (i) a pair of mounting extensions located near said rear end of said frame and extending generally parallel to and away from said rollers of said frame and (ii) a pair of adjustable hanger members extending from the frame near said front end thereof.

* * * * *